US012776203B2

(12) United States Patent
Catovic

(10) Patent No.: US 12,776,203 B2
(45) Date of Patent: Oct. 27, 2026

(54) METHOD AND COMPUTER SYSTEM DETERMINING A REPRESENTATION OF A PARAMETER

(71) Applicant: Telefonaktiebolaget LM Ericsson (PUBL), Stockholm (SE)

(72) Inventor: Armin Catovic, Stockholm (SE)

(73) Assignee: Telefonaktiebolaget LM Ericsson (PUBL), Stockholm (SE)

( * ) Notice: Subject to any disclaimer, the term of this patent is extended or adjusted under 35 U.S.C. 154(b) by 436 days.

(21) Appl. No.: 18/006,272

(22) PCT Filed: Jul. 22, 2020

(86) PCT No.: PCT/EP2020/070643

§ 371 (c)(1),
(2) Date: Jan. 20, 2023

(87) PCT Pub. No.: WO2022/017596

PCT Pub. Date: Jan. 27, 2022

(65) Prior Publication Data

US 2023/0290246 A1 Sep. 14, 2023

(51) Int. Cl.
*G08G 1/01* (2006.01)
*G08G 1/065* (2006.01)
*G06N 20/00* (2019.01)

(52) U.S. Cl.
CPC ........... *G08G 1/012* (2013.01); *G08G 1/0133* (2013.01); *G08G 1/0141* (2013.01); *G08G 1/065* (2013.01); *G06N 20/00* (2019.01)

(58) Field of Classification Search
CPC .... G08G 1/012; G08G 1/0133; G08G 1/0141; G08G 1/065; G08G 1/0129; G08G 1/015; G06N 20/00; G06N 7/01; H04L 67/12
See application file for complete search history.

(56) References Cited

U.S. PATENT DOCUMENTS 8,965,695 B2 2/2015 Tzamaloukas
9,589,465 B2 3/2017 Sandbrook
(Continued)

FOREIGN PATENT DOCUMENTS

CN 109410590 A 3/2019

OTHER PUBLICATIONS

EPO Communication pursuant to 94(3) EPC issued for Application No. 20 746 145.0-1213—Mar. 22, 2024.
(Continued)

*Primary Examiner* — Vladimir Magloire
*Assistant Examiner* — Ashley Brown Raynal
(74) *Attorney, Agent, or Firm* — Baker Botts L.L.P.

(57) ABSTRACT

A method and a computer system (001) for determine a representation of at least one area. The computer system comprises a plurality of nodes, and at least one machine learning model (002). Representation parameters may be associated with an environmental categorization of the area. The method comprises training (S31) a machine learning model, receiving (S32) information, obtaining (S33) an inferred representation parameter, and enabling the sending (S34) of the parameter. The training of the machine learning model can be achieved by using a set of training data where the data is representing a radio frequency characteristic, or a performance management counter. The information received is in the form of a radio frequency characteristic (006) or a performance management counter (007). The obtaining of the parameter associated with the environmental categorization is performed by using the machine learning model and the received information.

14 Claims, 8 Drawing Sheets

(56) References Cited

U.S. PATENT DOCUMENTS

| | | | | |
|---|---|---|---|---|
| 10,408,913 | B2 | 9/2019 | Miller | |
| 2014/0092771 | A1 | 4/2014 | Siomina et al. | |
| 2019/0049548 | A1 * | 2/2019 | Miller | H04B 17/345 |
| 2019/0208438 | A1 * | 7/2019 | Yang | H04L 43/16 |
| 2019/0277957 | A1 * | 9/2019 | Chandrasekhar | G01S 5/14 |
| 2019/0297459 | A1 * | 9/2019 | Wootton | H04W 4/023 |
| 2022/0014285 | A1 * | 1/2022 | Nakamura | H04B 17/27 |

OTHER PUBLICATIONS

Giulia Ronchi "The Art Performance that Broke Google Maps" Feb. 3, 2020.
6G White Paper on Localization and Sensing, 6G Research Visions, No. 12—Jun. 2020 [due to size, this has been split into six parts].
Nicholas Polson and Vadim Sokolov "Bayesian Analysis of Traffic Flow on Interstate I-55: The LWR Model", The Annals of Applied Statistics, 2015, vol. 9, No. 4, 1864-1888, Institute of Mathematical Statistics, 2015.
Bidisha Ghosh et al. "Bayesian Time-Series Model for Short-Term Traffic Flow Forecasting" Mar. 2007, Journal of Transportation Engineering.
Tianhong Li et al., "Making the Invisible Visible: Action Recognition Through Walls and Occlusions", Institute of Electrical and Electronics Engineers (IEEE), date issued Feb. 2020.
PCT Notification of Transmittal of the International Search Report and the Written Opinion of the International Searching Authority, or the Declaration issued for International application No. PCT/EP2020/070643—Mar. 31, 2021.

* cited by examiner

METHOD AND COMPUTER SYSTEM DETERMINING A REPRESENTATION OF A PARAMETER

PRIORITY

This nonprovisional application is a U.S. National Stage Filing under 35 U.S.C. § 371 of International Patent Application Serial No. PCT/EP2020/070643 filed Jul. 22, 2020 and entitled "Method and Computer System Determining a Representation of a Parameter" which is hereby incorporated by reference in its entirety.

TECHNICAL FIELD

The invention relates to a computer system comprising network nodes for determining a representation of at least one parameter associated with an environmental categorization of an area, a method for a computer system, a computer program, and a computer program product.

BACKGROUND

Inferring road traffic conditions in real-time is important for several different applications. Firstly, an example would be that, knowing traffic congestion spots can assist optimal route planning, something that is becoming increasingly important for ride-hailing, ridesharing, food delivery, and courier services, as they are heavily dependent on estimated time of arrival (ETA). Non-optimal routes lead to unnecessary increases in fuel consumption and wear-and-tear (e.g. burning of rubber tires due to friction and more rubber and road particles in the air), both of which induce significant financial cost on transport operators, as well as leading to both exhaust emissions, such as carbon dioxide ($CO2$), nitrogen oxide ($NOx$), particles, and non-exhaust emissions, the latter becoming ever more important due to uptake of electric vehicles (EVs), which are heavier than petroleum based ones. Secondly, knowing various traffic metrics in real-time, such as traffic flow, average speed, and traffic density, opens up for more dynamic public transport infrastructure optimizations, such as dynamically adjusting traffic light timing based on current traffic flow.

The current methods of inferring traffic conditions are either based on manual traffic counting, automatic traffic counting, or by collecting telemetry from smartphones and in-vehicle sensors such as GPS navigation systems and dedicated sensors in trams and buses. Manual traffic counting involves human observers who visually count traffic and report the tally either on a sheet or via an app or specialized handheld device. Manual methods also involve individuals reporting traffic incidents by contacting the local traffic authority. Automatic traffic counting includes installation of both permanent as well as temporary traffic counting devices. These electronic devices often involve sensors (pneumatic tubes, piezo-electric sensors, and inductive loops) placed on the road surface; changes in electric charge due to mechanical stress (e.g. by a passing vehicle) are then used to detect and tally traffic. Off-road sensors can also be used, such as infrared beams, radar, and cameras.

When it comes to smartphone and in-vehicle sensor data collection for traffic reporting purposes, it is generally done using GPS coordinates tracking of users and vehicles. In the case of smartphones, by estimating the speed at which the user is moving, combined with GPS coordinates of known roads, one can infer whether the user is inside a moving vehicle.

U.S. Pat. No. 8,965,695 B2 relates to a hierarchical floating car data network which comprises a central server, an egress point network, and a participating vehicle network. The egress point network is in communication with the central server. The egress point network comprises a plurality of egress points. The participating vehicle network comprises a plurality of participating vehicles. Some of the plurality of participating vehicles are in direct communication with each other and with at least some of the plurality of egress points. Furthermore, at least some of the plurality of participating vehicles may be in communication with the central server. A geographic database is formed from content communicated between the elements of the hierarchical floating car data network.

US 2019/0297459 A1 relates to systems and methods for detecting the presence of a body in a network without fiducial elements, using signal absorption, and signal forward and reflected backscatter of Radio Frequency waves caused by the presence of a biological mass in a communications network.

U.S. Ser. No. 01/040,8913 B2 relates to systems and methods of using a machine learning model to detect physical characteristics of an environment based on radio signal data. A system uses a radio signal receiver for collecting noise floor signal data comprising radio signal data from an environment within a predetermined proximity of the radio signal receiver. The system implements a trained deep machine learning classifier that is trained to classify one or more physical characteristics of the environment based on the radio signal data.

SUMMARY

An object of the invention is to enable dynamic traffic flow management, such as variable speed limit and traffic light timing, by enabling real-time traffic counts, for example, per vehicle category.

According to a first aspect of the invention, a method performed by a computer system is provided for determining a representation of at least one parameter associated with an environmental categorization of an area. The environmental categorization represents the area at a specified point in time or a specified time interval. The computer system comprises one or more network nodes. The method comprises training a machine learning model using a set of training data representing a first set of a radio frequency characteristic or a performance management counter; receiving at least one radio frequency characteristic or a performance management counter; obtaining the parameter associated with the environmental categorization by using the machine learning model after the training on the received radio frequency characteristic or the received performance management counter; and sending or initiating the sending of the parameter associated with the environmental categorization of the area obtained using the machine learning model to any one of: an information storage, a communication device, and a network node of the computer system. Hereby is achieved that information regarding an environmental categorization of an area at a point in time is provided and accessible. Thus information regarding an environmental categorization is provided without implementation of additional sensors or manual traffic counters.

According to a second aspect of the invention, a computer system is provided for determining a representation of at least one area as a parameter. The parameter is associated with an environmental categorization of the area at a specified point in time or a specified time interval. The network node is configured to receive at least one radio frequency characteristic or a performance management counter; obtain the parameter associated with the environmental categorization from a machine learning model that has been applied on the received radio frequency characteristic or the received performance management counter; and send or initiate the sending of the parameter associated with the environmental categorization of the area, to any one off at least one information storage, a communication device, and a network node of the computer system.

A third aspect of the invention is a computer program for a computer system for determining a representation of at least one parameter associated with an environmental categorization of at least one area. The environmental categorization represents the area at a specified point in time or a specified time interval. The computer program comprises computer program code which, when run on the computer system, causes the computer system to perform the step of receiving at least one radio frequency characteristic or a performance management counter; obtaining, by using the received radio frequency characteristics or the performance management counter and a machine learning model, the parameter associated with the environmental categorization of the area; sending or initiating the sending of the parameter associated with the environmental categorization obtained by the machine learning model to any one off: one information storage, a communication device, and a network node of the computer system.

In a fourth aspect of the invention a computer program product is provided, which comprises a computer program according to the third aspect. The computer program product has a computer readable means on which the computer program is stored.

In an embodiment of the first and second aspect the area comprises a vehicular traffic area. Alternatively, in some embodiments the area comprises a pedestrian traffic area. In an embodiment of the first, second and third aspect, the obtained parameter of the environmental categorization of the area comprises at least one traffic congestion parameter. The traffic congestion parameter is at least an indication of vehicle traffic congestion or pedestrian traffic congestion in the area. In other embodiments the traffic congestion parameter is at least any one of a vehicle flow rate, a vehicle count and a vehicle type. Hereby vehicular traffic counting is achieved.

In an embodiment of the first, second and third aspect, the obtained parameter of the environmental categorization of the area is dependent upon values each representing a vehicle type. The vehicle type is any one or more of the following: car, van, bus, lorry, tram, bicycle, moped, motorcycle, caravan tanker, trailer, construction vehicle, cyclist, all-terrain-vehicle, four-wheeler, train, scooter, and electric scooter. Any, or all of the above types of vehicles can be counted at a point in time, or across a period of time. Hereby insights into the types of vehicular traffic flow are enabled.

In an embodiment of the first, second and third aspect, the machine learning model is implemented in a distributed computing platform within the computer system. In another embodiment the machine learning model is a Bayesian model. Hereby is achieved calculations across the distributed computing platform resource.

In an embodiment of the first, second and third aspect, the received radio frequency characteristic is from a radio frequency characteristic of radio waves of signals propagated from at least one wireless communication device to a radio base station. Alternatively, in yet another embodiment of the first, second and third aspects, the received performance management counter is derived from a radio frequency characteristic of radio waves of signals propagated from at least one wireless communication device to a base station.

In embodiments of the first, second and third aspect, the received radio frequency characteristic or the performance management counter includes at least one uplink pathloss value. Further, in another embodiment, the received radio frequency characteristic or the performance management counter includes a doppler shift spread value.

In an embodiment of the first, second and third aspect, the received radio frequency characteristic or the performance management counter are received from a network operations support system. Alternatively, in another embodiment, the received radio frequency characteristic or the performance management counter is received from a business support system.

In embodiments of the first aspect, the specified point in time is a current point in time. In yet another embodiment, the specified time interval is any specific interval of a number of minutes and/or a number of hours. Alternatively, in some embodiments, determining the representation of the at least one area as the parameter associated with the environmental categorization of the areas further determines a forecast of the parameter associated with the environmental categorization. Further, in yet another embodiment the determined forecast comprises a time interval ahead of the current date. The time interval is any interval of a number of minutes and/or a number of hours. In an embodiment according to the second aspect, determining the representation of the area as the parameter associated with the environmental categorization of the area further determines a forecast of the area as a second set of parameters associated with a second environmental categorization of the area.

An embodiment of the first and second aspect is where the provided computer system is a single network node. Alternatively, in another embodiment of the first and second aspect, the computer system comprises a first network node for receiving the radio frequency characteristic or the performance management counter. A second network node for obtaining the parameter associated with the environmental categorization of the area. The obtaining performed using the machine learning model on the at least one received radio frequency characteristic or performance management counter. The sending or initiate the sending of the parameters associated with the environmental categorization of the area is performed by either the first network node, the second network node, or a third network node comprised in the computer system.

Further advantages of embodiments of the invention are cost and energy savings on measuring devices, sensors and human resources for manual traffic condition interference.

BRIEF DESCRIPTION OF THE DRAWINGS

The invention is now described, by way of example, with reference to the accompanying drawings, in which.

DETAILED DESCRIPTION

Figure 1:
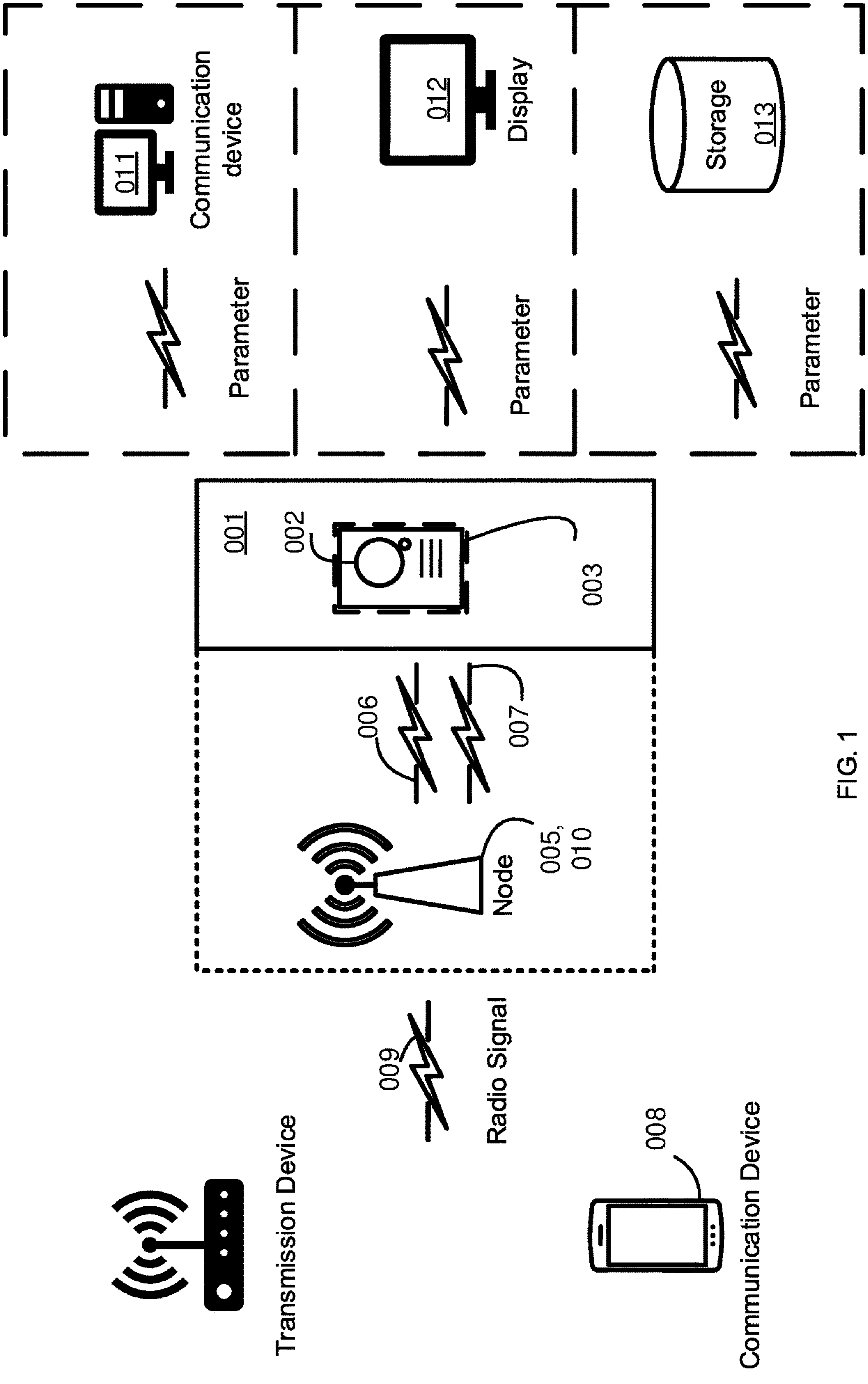
FIGS. 1-2 illustrate a computer system according to some embodiments.

The invention will now be described more in detail hereinafter with reference to the accompanying drawings, in which certain embodiments of the invention are shown. This invention may, however, be embodied in many different forms and should not be construed as limited to the embodiments set forth herein; rather, these embodiments are provided as examples of embodiments within the claimed scope.

It is to be understood that the singular form "a," "an," and "the" include plural referents unless the context clearly dictates otherwise. It will be further understood that the terms, "comprises" "comprising", "includes" and/or "including" when used herein, specify the presence of stated features, integers, steps, operations, elements, and/or components, but do not preclude the presence or addition of one or more other features, integers, step, operations, elements, components, and/or groups thereof.

An advantage of embodiments of the invention will be the enabling of monitoring of traffic in areas without the need to provide specific infrastructure components or excessive human resources to accomplish such tasks. It also enables the ability to have an overview of traffic flow, what type of traffic the traffic comprises of, and movements of traffic in specific areas. This will enable insights into traffic management systems, including visualizations of traffic hotspots, enable ease of heavy-traffic burdened areas and allows the user of the invention to supply further detailed information such as real-time optimal route planning, and future traffic predictions due to the continues generation and analysis of real time data.

According to the invention, a machine learning model is trained. The training is done by using a set of training data. The machine learning model can use several sets of training data to reinforce the machine learning model training. The set of training data is representative of a radio frequency characteristic or a performance management counter. A variety of input parameters, from none, one or a plurality, that can be controlled for, may be used by the machine learning model to account for any difference between use cases of the machine learning model. The machine learning model can be a Bayesian model. The Bayesian model may be such that one can encode a model using prior real-world knowledge corresponding to various parts of the model.

As used herein, examples of input parameters that can be controlled for may be, traffic information, congestion information, communal traffic route, communal traffic timetable, and the base station's cell configuration data, e.g. a cell id, a cell name, a bandwidth, a longitude, a latitude, a bearing, an angle, a radius, a cell range, a cell capacity, a downlink channel bandwidth, an uplink channel bandwidth, a band, a downlink frequency, and an uplink frequency.

An area is represented using one or more parameters where the parameter is associated with an, or several, environmental categorizations of the area. The parameter can be a numerical value, a text, a symbol, binary code, or other type of information display, representing for example a vehicle flow rate, a vehicle count, and a vehicle type. The term "environmental categorization," as used herein, refers to a categorization of a physical environment dependent upon attributes attributed to a one or more conditions of the physical environment. The environmental categorization of the area is any one or a combination of the following, a high-rise area, suburban houses, a park, a garage, a congested area, high traffic, low traffic, medium traffic, no traffic, many pedestrians, no pedestrians, dense wood, sparse tree, open field, lake, mountainous, hilly, rocky, fallow farmland, farmland, crops, grazing pasture, subway, fast traffic flow, and slow traffic flow or other reasonable representation of a categorization of the area. The term environmental categorization embodies a way to infer a characteristic of the area at a specific point in time, such as the state of the area at the current point in time. In one embodiment the specified point in time is offset from the current time, by a time period selected from any of: a number of minutes, a number of hours, a number of days, a number of weeks, a number of months and a number of years, in the past. According to another embodiment the represented point in time is set in the future, offset from the current time, by a time period selected from any of: a number of hours, a number of days, a number of weeks, a number of months and a number of years. Alternatively, in another embodiment, the time is a specified time interval spanning the range of a number of minutes, a number of hours, a number of days, a number of weeks, a number of months and a number of years, or variants thereof. This entails a continuum of points in time; either past, present or future is possible for the area.

Figure 2:
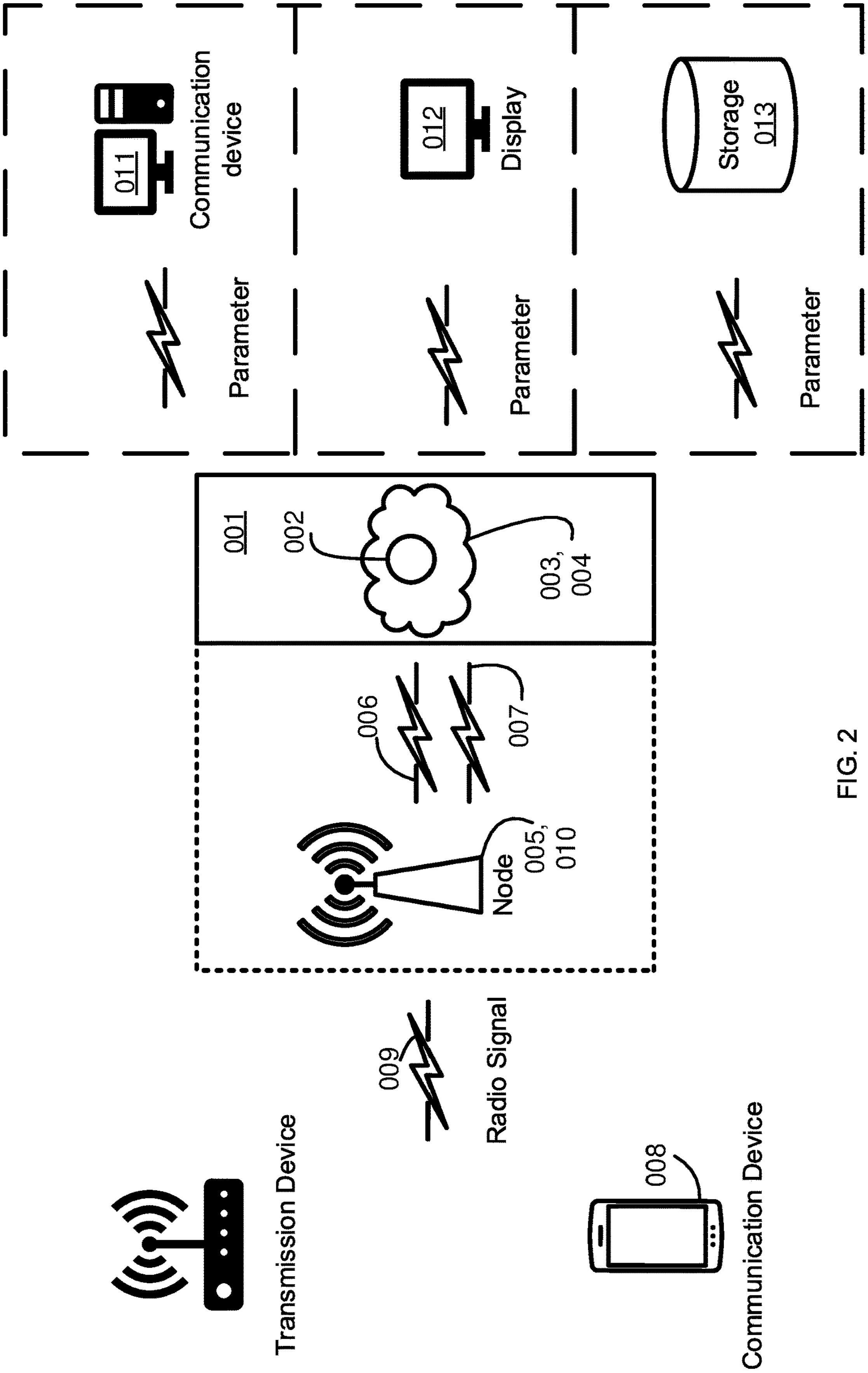

FIG. 1 and FIG. 2 illustrate a computer system 001. The computer system 001 comprises a machine learning model 002 and one or more network nodes 003. The machine learning model 002 refers to a mathematical model based on sample data, computational neural network-based decisions, or supervised learning system. FIG. 1 and FIG. 2 show the machine learning model 002 as located as data and software stored and processed within the network node 003. As illustrated in FIG. 1, the network node 003 is a physical network device, such as in a radio access network device, a radio core network device, a distributed networks system node and, in FIG. 2, a distributed computing platform (e.g a cloud computing platform) node 004 such as a server, or a virtual network node which can be implemented in a cloud. The two figures further illustrate embodiments where another network node, a radio network node 005, e.g. in the form of a radio base station (e.g. 010 as mentioned below) in the form of a standardized base station such as nodeB or evolved NodeB (eNB), for Long Term Evolution or gNodeB for New Radio (NR), is transmitting a radio frequency characteristic, 006, to the computer system 001. It will be appreciated by the person skilled in the art that the radio frequency characteristic 006 can be exposed in a performance management counter 007. In other words, the radio frequency characteristic 006 may be a part of the performance management counter 007. In other words, FIG. 1 and FIG. 2 illustrate the computer system 001 as receiving the radio frequency characteristic 006 or the performance management counter 007. According to one embodiment illustrated in FIG. 1, the radio frequency characteristic 006 is derived from a transmission from a communication device 008. For example, the communication device 008 transmits radio signals 009 to a radio base station 010, which is the radio network node 005. The radio base station 010 then performs at least any one of: to capture, to measure and to record, the radio frequency characteristic 006 of the transmitted radio signals 009 in the performance management counter 007 of an operations support system (OSS). The radio frequency characteristic 006 or the performance management counter 007 are then subsequently sent by the radio base station 010, e.g as JSON encoded HTTP POST message, and received by the computer system 001 where they are processed according to a method illustrated in the flowcharts in either FIGS. 3 and 4, which are described in more detail below. In other words, an embodiment comprises gathering of information at the radio base station 010, sending out the information from the radio base station, and receiving the information by the computer system 001. The radio base station 010 provides radio connectivity to a plurality of wireless terminals or communication devices such as, for example, the communication device 008, and a second communication device 011.

The network node 003 may in another embodiment be the radio network node 005 as indicated with a dashed line in FIG. 1. It will be appreciated that the radio network node may refer to a base station as mentioned above, a base transceiver station, an access point, a network control node such as a network controller, a radio network controller, a base station controller, and the like or some combination thereof. The network node 003 may, in an embodiment, be a modem, hub, bridge, switch or other data communication equipment, or a data terminal equipment such as a host computer.

As used herein, the term radio frequency characteristic 006, represents a characteristic of a radio wave frequency. This radio frequency characteristic 006 can be a value of or can be derived from, the effects of reflection, refraction, polarization, diffraction, free-space loss, aperture-medium coupling loss, absorption, or others. The radio frequency characteristic 006 can also be based upon the effect that occurs, such as pathloss, uplink-pathloss, path attenuation, received power, transmitted power, transmitter gain, transmitter losses, receiver gain, receiver losses, Doppler shifts, or Doppler shift spreads. As used herein, the term, performance management counter 007 may be data received from a network element in a mobile network operators' network or support system. The performance management counter 007 or radio frequency characteristic may also be received from a telecommunications service provider's business support system. The performance management counter 007 may further contain information such as the timing advance (TA) index and number of successful radio resource control (RRC) connections counted. As an example of where one or more radio frequency characteristics are captured is in a radio access network (RAN), is the radio base station, with the radio base stations comprises such as mentioned above. These can be exposed via performance management counts on the north-bound interface to the radio access network's OSS.

As used herein the term communication device 008, which may be known as a "wireless terminal" or a "User Equipment" (UE), which may further refer to a mobile phone, a cellular phone, a Personal Digital Assistant (PDA), equipped with radio communications capabilities, a smart phone, iPAD, USB dongle e.g. with a radio modem, a laptop or personal computer, PC, equipped with an internal or external mobile broadband modem, a tablet PC with radio communication capabilities, laptop embedded equipment, a laptop mounted equipment, a device to device UE, a machine type UE or UE capable of machine to machine communications, customer premises equipment, a portable electronic radio communication device, a sensor device equipped with radio communication capabilities, a telematics unit within a vehicle or the like. In particular, the term "communication device" should be interpreted as non-limiting terms comprising any type of wireless device communicating with a radio network node in a cellular or a mobile communication system.

The information exchange between the network node 003 and the computer system 001 can be facilitated by one or more service architectures including but not limited to Simple Object Access Protocol (SOAP), Representational State Transfer (REST) and Remote Procedure Call (RPC). The service architectures utilize a number of application layer protocols including Hypertext Transfer Protocol (HTTP), Simple Mail Transfer Protocol (SMTP), Secure Shell (SSH), and File Transfer Protocol (FTP). Data encoding and representation can take form of JavaScript Objection Notation (JSON), Extensible Markup Language (XML), as well as binary data encoding including but not limited to Protocol Buffers (Protobuf) as well as FlatBuffers.

For example, initial configuration management data related to 4G/5G cell configuration (e.g. cell-id, frequency, bandwidth, longitude, altitude, etc) is sent from a mobile network operator to the computer system 001 as JSON encoded objects via HTTP POST messages.

The computer system uses the received configuration management data from the mobile network operator together with a suitable radio wave propagation model (e.g. Okumura-Hata) as well as auxiliary data from mapping services (e.g. OpenStreetMap) and traffic authorities to create an internal representation of a cell and its coverage area. From the computer systems point of view a cell will now be considered as a traffic counter or a sensor, responsible for counting traffic on the roads within its estimated coverage area.

Performance management data such as uplink path loss are then periodically extracted from the performance management data stored in the OSS and sent from the mobile network operator to the computer system 001 as JSON encoded objects via HTTP POST messages. The computer system maps the Performance Management counters to their respective cells (internal cell/sensor representation), and applies the machine learning model to infer traffic characteristics such as vehicle flow rate and vehicle counts.

The estimated traffic characteristics can in some embodiments be stored internally in the computer systems data storage.

An insight consumer, such as a city municipality, can then request traffic data by sending a HTTP GET message to the computer system's REST endpoint. The computer system responds by sending JSON encoded data containing traffic flow information.

Further, FIG. 1 and FIG. 2 illustrate the information being transmitted or sent from the computer system 001 comprising the machine learning model 002 to any one, more than one, or all the following: a second communication device 011, a display 012 of e.g. a third-party outside of the computer system 001, and a storage device 013, the storage is in some embodiments localized within the computer system. In an embodiment the information is a parameter associated with the environmental categorization of an area.

Figure 3:
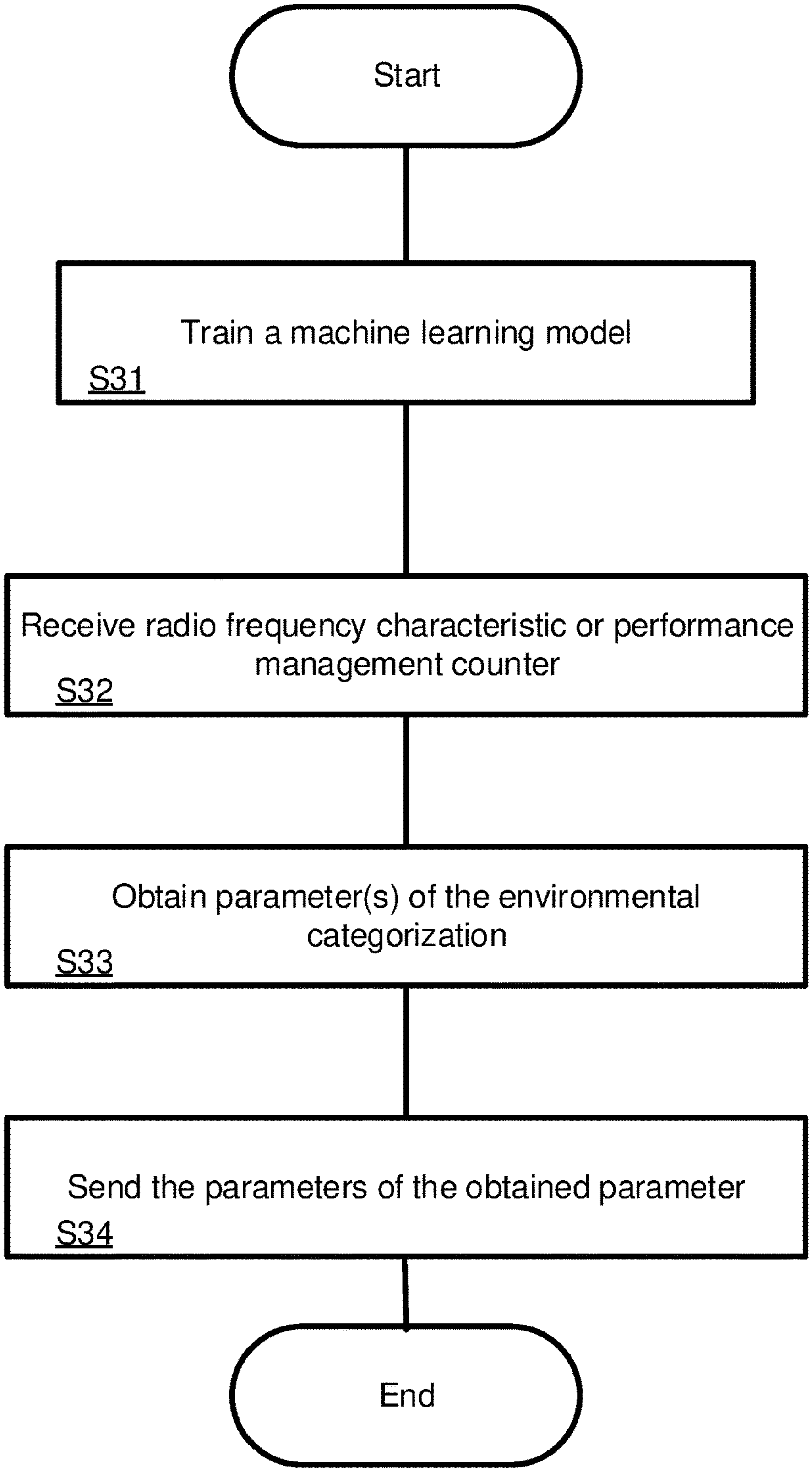
FIGS. 3-4 are flow charts illustrating exemplary methods of determining a parameter of an area.
Figure 4:
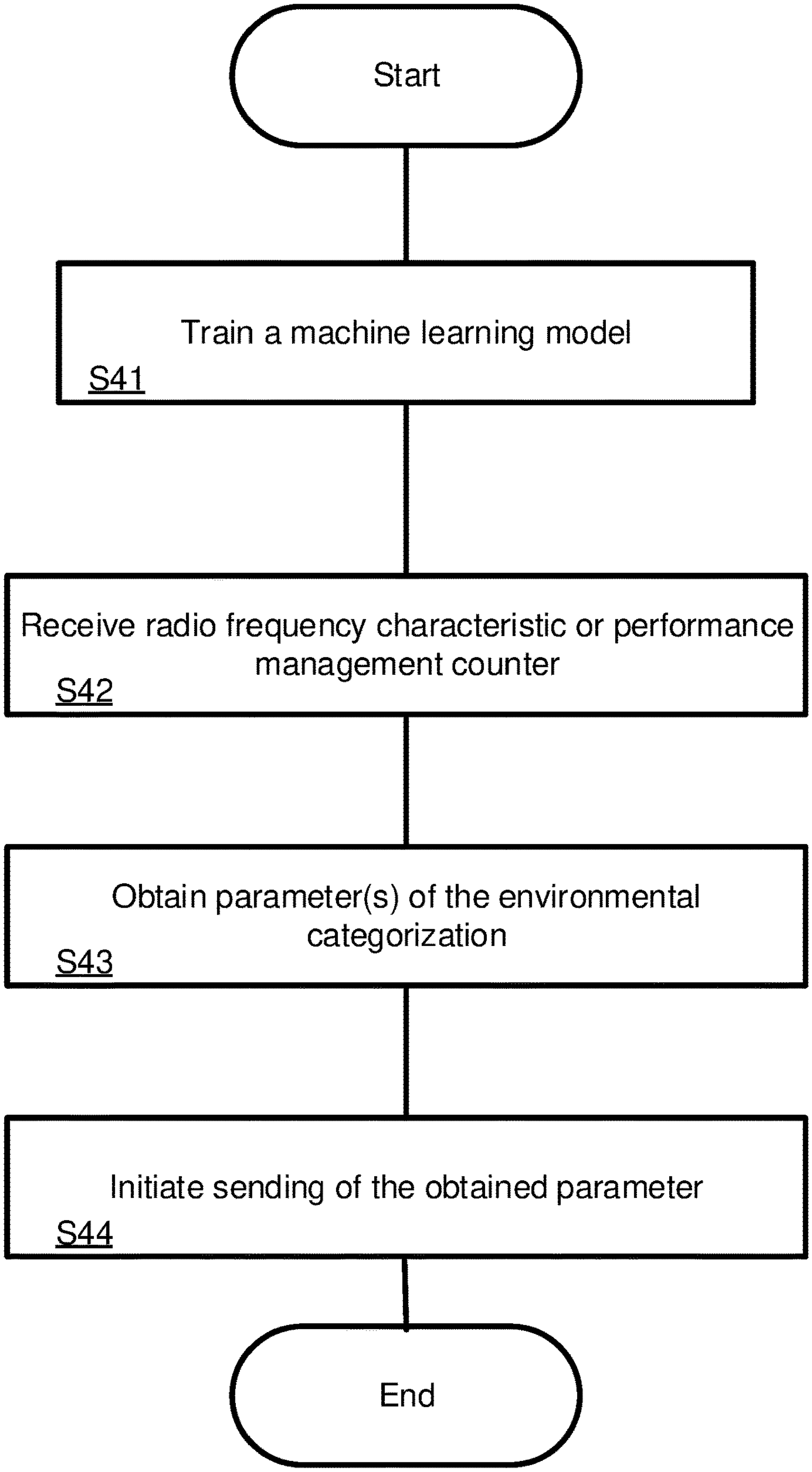

FIG. 3 and FIG. 4 illustrate embodiments of a method performed by the computer system 001. FIG. 3 illustrates an embodiment for determining a representation of at least one area; training, S31, the machine learning model 002; receiving, S32, information, where the information is the radio frequency characteristic 006 or the performance management counter 007; and obtaining, S33, the parameter of the environmental categorization, in one example, the obtaining is performed from a machine learning model comprised within the computer system, the machine learning model is applied on the received information to infer the parameters, another example is where the computer system access the machine learning model by sending the received information to a machine learning model located outside the computer system, which is then applied on the information and then the inferred parameters are obtained. Further, FIG. 3 illustrates the method further comprising, sending, S34, the parameter of the obtained environmental categorization e.g. as JSON encoded data in a HTTP POST message. In some embodiments illustrated in FIG. 4, the method comprises training S41 the machine learning model 002; receiving S42 information, which is the radio frequency characteristic 006 or the performance management counter 007, and obtaining S43 the parameter of the environmental categorization. Further illustrated in FIG. 4, is that the embodiment of the method here also comprises initiating, S44, the sending of the information. To train, S31, S41, the machine learning model 002, the computer system uses a set of training data. The training data is representative of radio frequency characteristics and/or information contained within performance management counters. Further, the training of the machine learning model 001 can be an iterative process, with the training of the machine learning model 001 occurring across several dependent training steps. In other words, the machine learning model 001 is trained, in one or several stages, to interpret and act upon information that the computer system 001 has access to, by using data representative of the information or other complementing information, enabling an interpretation/inference of a location's physical characteristics. In certain embodiments the information is received, S32, S42, from the radio network node 005. The information that is received, S32, S42, may contain, data traffic, the performance management counter 006, an environmental categorization, a forecast of the environmental categorization, i.e. a forecast of the parameters representing the environmental categorization, the radio frequency characteristic 007, and/or any other suitable information such as a country id, an operator id, a node id, a measurement time or a timestamp, a measurement period, a cell id, a cell name, a counter e.g. of vehicle types, a number of successful RRC connections established, and a pathloss value e.g. a pathloss distribution in decibels.

The information exchange may be facilitated by the several service architectures explained above. To obtain, S33, S43, the parameter the received information is processed using the machine learning model 002. In other words, the parameter that is associated with the representation of the environmental categorization, is obtained by processing received information with the machine learning model 002. The obtained parameter is transmitted or sent S34 by the computer system 002. The sending or transmission may be to the second communication device 011, the storage 013 or a processing node outside of the computer system or a network node of the computer system (not illustrated).

Figure 5:
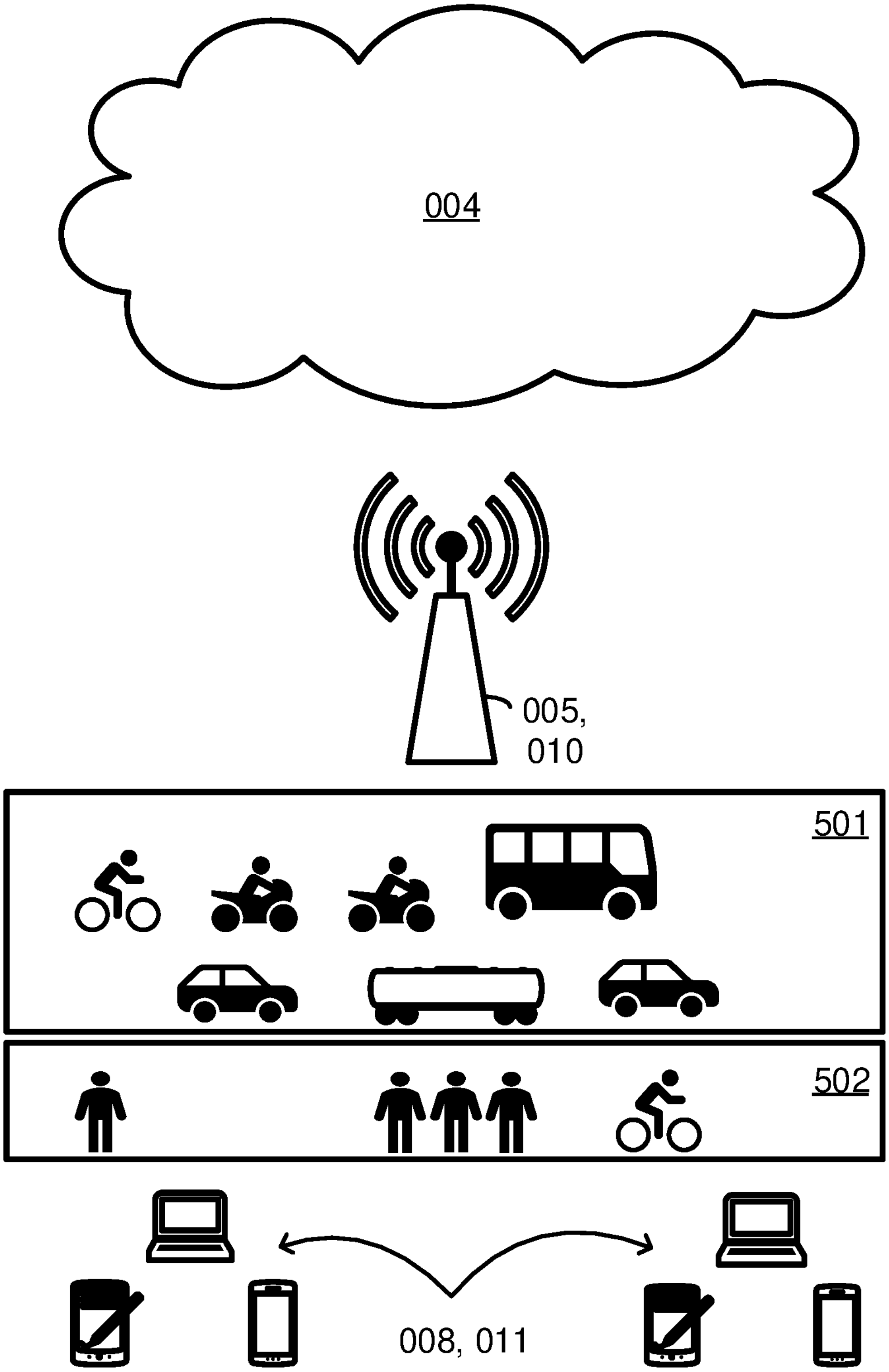
FIG. 5 illustrates an area and network node of the invention with respect to embodiments thereof, FIG. 6 exemplifies variants of environmental categorization.

FIG. 5 illustrates embodiments wherein the communication device 008, and at least the second communication device 011 are shown as being present at a location. Two exemplary areas, 501 and 502, are illustrated between the communication devices 008, 011, and a receiver of radio signals, which in this case is the radio network node 005, which can be the base station 010. Both trafficked areas, 501, 502 environmental conditions are determined in the form of the environmental categorization, examples of which will be described further with reference to FIG. 6. The radio frequency characteristics of the signals transmitted from the communications devices 008,011 are captured in the radio network node 005 and further transmitted to the computer system 001 embodied as a single network node, or as illustrated in FIG. 5, a distributed computing platform, 004.

The areas may be others than those represented in FIG. 5 and it is merely for illustrative purposes to highlight various areas that may be comprised in the embodiments of the disclosure. The area, representing a geographical area represented by e.g. geographical coordinates or a name or a word or a numerical value, may be the vehicular trafficked area 501 where such an area could be or comprise one or more of at least a road, a highway, a sidewalk, a garage, a bridge, a car park, and other terrain and areas traversed by vehicular traffic. The area is in an embodiment the pedestrian trafficked area 502. The pedestrian area 502 may be or comprise at least one or more of at least a sidewalk, a park, a forest path, a road, a shopping mall, a subway station, and other area traversed by a pedestrian. The pedestrian trafficked area is an area traversed by a human, which can be an area traversed using a car such as a road, parking area, and gas station. The area could further be areas traversed by a human using others means such as bicycle or walking. In other words, the area may also comprise a walkway, a crosswalk, a bicycle path, a housing building, a park, and further variants thereof. The area in yet another embodiment, is an area such as a landscape area, which may be a lake, a forest, a mountain, and a field, and variants thereof. The area is located near a site/device that can receive and, in some embodiments, process signals, which in an embodiment represented in FIG. 5, is the radio network node 005.

As used herein, the area, could further be any region of a landscape, where the region of the area could be any size, but commonly the area may be the region within range of a radio network node. The range can be several hundreds of meters, up to 1000 meters, with the range further being specified to be between 0-600 meters. The range is dependent on the carrier frequency with more precise measurement at smaller distance using higher frequencies. The person skilled in the art will appreciate that with new technologies the effective range can be expanded to beyond 1000 meters.

Figure 6:
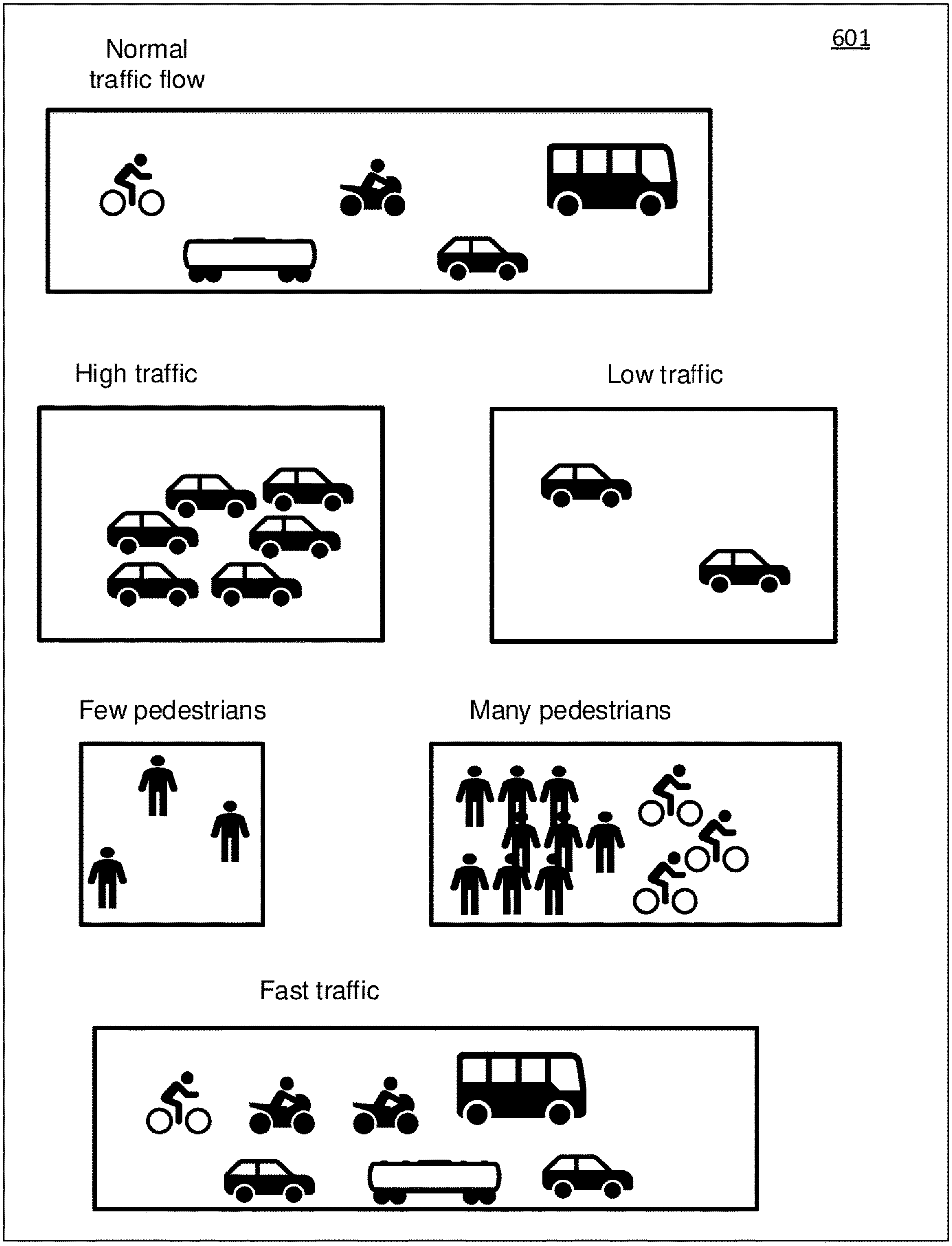

Another embodiment of the invention is where the environmental categorization parameter, in FIG. 6 indicated as 601, indicates vehicular traffic congestion or pedestrian traffic congestion in the area. Examples of what can be indicated in the environmental categorization parameter 601 is further illustrated in FIG. 6. The environmental categorization parameter 601 is in some embodiments related specifically to details regarding traffic congestion activities, which may be the numbers of vehicles or pedestrians, the flow rate of such objects, which could be as a rate of change in the area across time, or a count per unit time. Further, the flow rate may also be defined descriptively such as high rate of traffic, high traffic, medium amount of traffic, and/or low traffic flow, slow traffic, or variants thereof. Further information is also the types of objects moving in the area. A non-exhaustive but representative list of what objects of the embodiment may be is any one of the following: car, van, bus, lorry, tram, bicycle, moped, motorcycle, caravan, tanker, trailer, construction vehicle, cyclist, all-terrain-vehicle, four-wheeler, train, scooter, electric scooter, pedestrian. These objects may be described in numerical terms where the parameters are, for example; "four cars, three pedestrians, one bus, two mopeds", and is a representation of the area.

Figure 7:
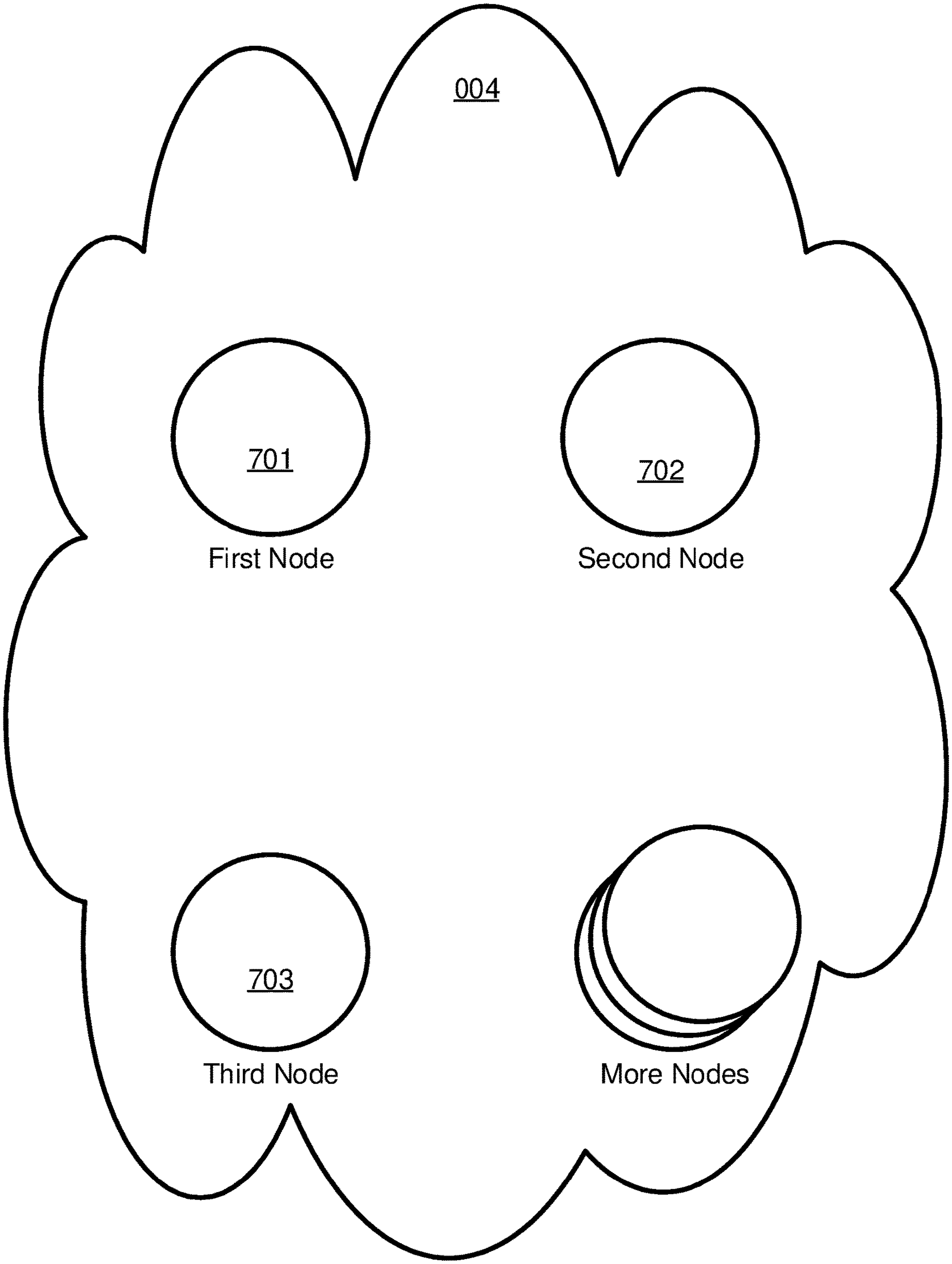
FIG. 7 illustrates an example of distributed nodes according to embodiments.

Another embodiment, partially illustrated in FIG. 7, is a computer system 001, consisting of a multitude of network nodes 004 as described above where the training S31, S41 of the machine learning model 002 is performed in a singular network node or, in another embodiment, across many network nodes. The receiving, S32, S42, of the radio frequency characteristic 006 or the performance management counter 007 is performed in a first network node 701 or across a plurality of network nodes. It will be appreciated by one skilled in the art that the receiving of the radio frequency characteristic 006 or the performance management counter 007can be the receiving of information inferred from radio frequency characteristic 006 or exposed as part of the performance management counter 007. The obtaining, S33, S43, of the environment categorization parameter (i.e the parameter associated with an environmental categorization, is performed in a second network node 702 or across many network nodes and the initiation S44 or the sending S34 of the value obtained is performed in any of: the first network node, the second network node, a third network node 703, and several distributes network nodes withing the computer system. The network node 003, 701, 702, 703 is in some embodiments a virtual network node.

Figure 8:
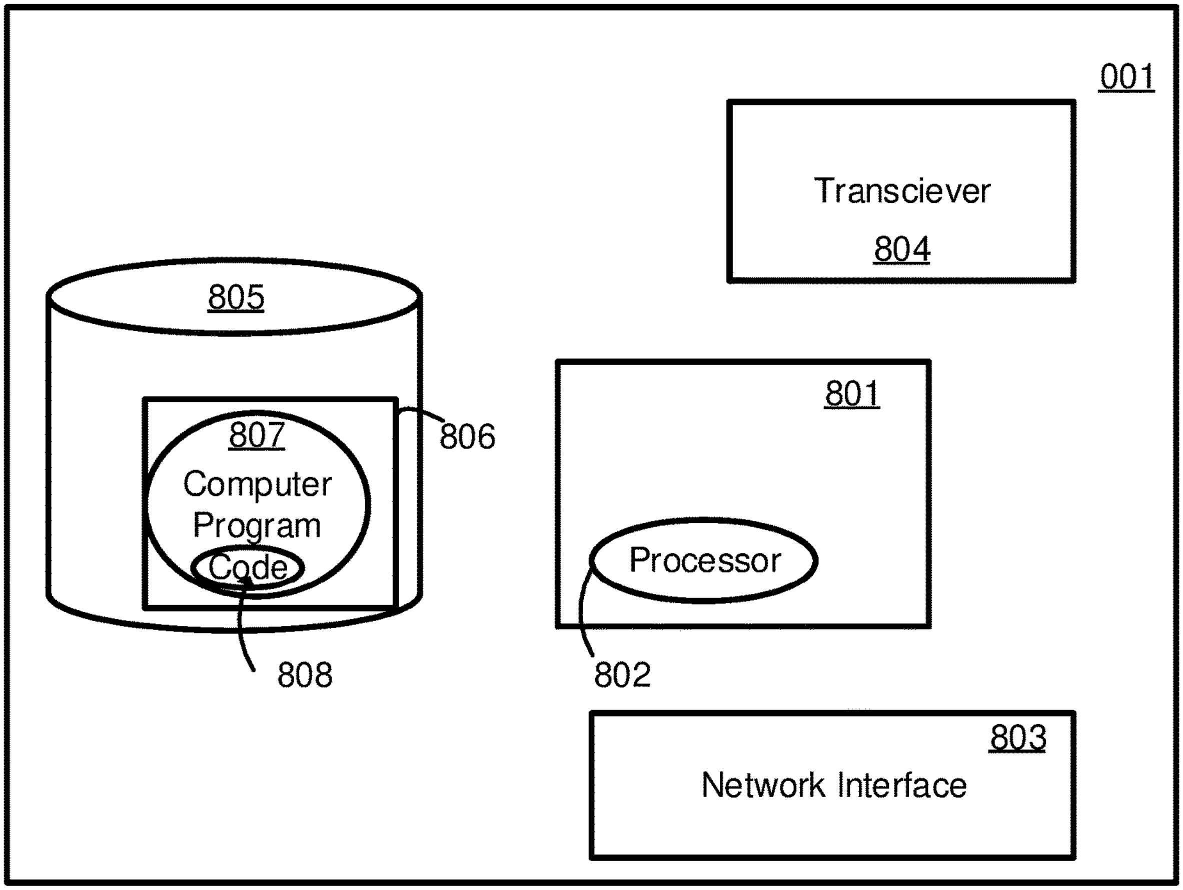
FIG. 8 is a block diagram of a computer system according to embodiments.

FIG. 8 illustrates a block diagram of an embodiment of the computer system 001, which comprises a computer (e.g. in the form of a server host) 801 which includes one or more processors 802, e.g. any one of, a general purpose microprocessor, and one or more data processing circuits, such as an application specific integrated circuits, and field-programmable gate arrays. The computer system 001 in some embodiments further includes a network interface 803 to connect to a network. The network interface is in some embodiments used in communicating with network nodes of the computer system outside of the computer, or any other connections. The computer system 001 also comprises a transceiver 804 coupled to an antenna for wirelessly communicating with another network node or with a communication device outside of the computer system 001. The computer system 001 further includes a computer program product in the form of a data storage for storing information, which may include one or more computer readable storage medium 806 in the form of non-volatile memories, and/or one or more volatile memories such as random-access memory. The computer program product 805 comprises a computer program 807, which comprises computer instructions or code 808. The computer readable storage medium 806 can be a non-transitory computer readable medium such as, a magnetic media where a hard disk is an example thereof, optical media, such as a DVD, and a flash memory The computer instructions of the computer program are configured such that when executed by computer the computer instructions cause the computer to perform some or all of the functions and operations described herein.

The various embodiments described herein may be implemented in a recording medium readable by a computer or its similar device by employing for example, software, hardware or combinations thereof.

A software implementation of the embodiments described may be implemented as procedures and functions that may be implemented in separate modules and/or computer program parts, each of which is written to cause a computer system to perform one or more of the functions and operations described herein. Software codes may be implemented using a software application written in any suitable programming language.

While various embodiments of the present disclosure are described herein, it should be understood that they have been presented by the way of example only, and not limitation. Thus, the breadth and scope of the present disclosure should not be limited by any of the above-described exemplary embodiments. Moreover, any combination of the above-described elements in all possible variations thereof is comprised by the disclosure unless otherwise indicated herein or otherwise clearly contradicted by context. Additionally, while the processes described above and illustrated in the drawings are shown as a sequence of steps this was done for the sake of illustration. It is contemplated that some steps may be added, some steps omitted, the order of the steps may be re-arranged, and some steps may be performed in parallel.

The invention claimed is:

1. A method performed by a computer system comprising one or more network nodes for determining at least one parameter associated with an environmental categorization of an area, the environmental categorization representing the area at a specified point in time or a specified time interval, the method being:

training a machine learning model using a set of training data representing a first set of radio frequency characteristics or a performance management counter, wherein the radio frequency characteristics or the performance management counter in the set of training data is derived from radio waves of signals propagated from at least one wireless communication device to a radio base station, and the training further comprises correlating the radio frequency characteristics or the performance management counter with a number of radio resource control connections established at a time at which the training data is collected;

receiving at least one radio frequency characteristic or a performance management counter, wherein the received radio frequency characteristic or performance management counter is received from an operation support system, or a business support system, and wherein the received radio frequency characteristic or performance management counter is derived from radio waves of signals propagated from at least one wireless communication device to a radio base station;

obtaining the parameter associated with the environmental categorization, wherein the parameter is obtained by inputting the received at least one radio frequency characteristic or the performance management counter to the trained machine learning model and obtaining the parameter as output from the trained machine learning model; and sending or initiating the sending of the parameter associated with the environmental categorization of the area obtained using the machine learning model to any one of: an information storage, a communication device, and a network node of the computer system wherein the parameter associated with the environmental categorization of the area comprises at least one traffic congestion parameter, wherein the traffic congestion parameter is at least an indication of vehicle traffic congestion or pedestrian traffic congestion in the area and the traffic congestion parameter is at least any one of a vehicle or pedestrian flow rate, a vehicle or pedestrian count, and a vehicle or pedestrian type.

2. The method according to claim 1, wherein the received radio frequency characteristic or the performance management counter includes at least one uplink pathloss value.

3. The method according to claim 1, wherein the received radio frequency characteristic or the performance management counter includes at least one doppler shift spread value.

4. The method according to claim 1, wherein the computer system comprises a first network node for receiving the radio frequency characteristic or performance management counter;

a second network node for obtaining the parameter associated with the environmental categorization of the area using the machine learning model on the received radio frequency characteristic or received performance management counter; and sending or initiating the sending of the parameter associated with the environmental categorization of the area is performed by either the first network node, the second network node, or a third network node comprised in the computer system.

5. A computer system comprising one or more network nodes for determining at least one area as a parameter associated with an environment categorization of an area, at a specified point in time or a specified time interval;

the network nodes being configured to:

receive at least one radio frequency characteristic or performance management counter, wherein the received radio frequency characteristics or the performance management counter is received from an operation support system, or a business support system, and wherein the received radio frequency characteristic or performance management counter is derived from radio waves of signals propagated from at least one wireless communication device to a radio base station;

obtain the parameter associated with the environmental categorization from a machine learning model that has been applied on the received radio frequency characteristic or the received performance management counter, wherein the machine learning model was trained by correlating a radio frequency characteristic or a performance management counter with a number of radio resource control connections established at a time at which training data was collected; and send or initiate the sending of the parameter associated with the environmental categorization, of the area, to any one of at least one information storage, a communication device, and a network node of the computer system and wherein the parameter associated with the environmental categorization of the area comprises at least one traffic congestion parameter, wherein the traffic congestion parameter is at least an indication of vehicle traffic congestion or pedestrian traffic congestion in the area and the traffic congestion parameter is at least any one of a vehicle or pedestrian flow rate, a vehicle or pedestrian count, and a pedestrian vehicle type.

6. The computer system according to claim 5, comprising a first network node for receiving the radio frequency characteristic or performance management counter, a second network node for obtaining the parameter associated with the environmental categorization of the area using the machine learning model on the received radio frequency characteristic or performance management counter.

7. The computer system according claim 6, wherein the sending or the initiation of the sending of the transmission of the obtained parameter associated with the environmental categorization is performed in either the first network node, the second network node, or a third network node.

8. The computer system according to claim 5, wherein the received radio frequency characteristic or the performance management counter includes at least one uplink pathloss value.

9. The computer system according to claim 5, wherein the received radio frequency characteristic or the performance management counter includes at least one doppler shift spread value.

10. The computer system according to claim 5, wherein the specified point in time is a current point in time.

11. The computer system according to claim 5, wherein the specified time interval is any interval of a number of minutes and/or a number of hours.

12. The computer system according to claim 5, wherein determining the representation of the area as the parameter associated with the environmental categorization of the area further determines a forecast of the area as a second set of parameters associated with a second environmental categorization of the area.

13. The computer system according to claim 12, wherein the forecast comprises a specific time interval, wherein the specific time interval is any interval of a number of minutes and/or a number of hours.

14. A computer program product comprising a computer program for a computer system for determining at least one parameter associated with an environmental categorization of an area, the environmental categorization representing the area at a specified point in time or a specified time interval, and a nontransitory computer readable means on which the computer program is stored, wherein the computer program comprises computer program code, which, when run on the computer system, causes the computer system to perform the steps of:

receiving at least one radio frequency characteristic or a performance management counter, wherein the received radio frequency characteristics or the performance management counter is received from an operation support system, or a business support system, and wherein the received radio frequency characteristic or performance management counter is derived from radio waves of signals propagated from at least one wireless communication device to a radio base station, obtaining, by using the received radio frequency characteristic or performance management counter, and a machine learning model, the parameter associated with the environmental categorization of the area, wherein the machine learning model was trained by correlating a radio frequency characteristics or a performance management counter with a number of radio resource control connections established at a time at which training data was collected, and sending or initiating the sending of the parameter associated with the environmental categorization, obtained by the machine learning model to any one of: at least one information storage, a communication device, and a network node of the computer system and wherein the parameter associated with the environmental categorization of the area comprises at least one traffic congestion parameter, wherein the traffic congestion parameter is at least an indication of vehicle traffic congestion or pedestrian traffic congestion in the area and the traffic congestion parameter is at least any one of a vehicle or pedestrian flow rate, a vehicle or pedestrian count, and a vehicle or pedestrian type.

* * * * *